United States Patent
Jung et al.

(10) Patent No.: US 8,519,717 B2
(45) Date of Patent: Aug. 27, 2013

(54) METHOD FOR DETECTING ICE BLOCKING OF FUEL CELL STACK AND CONTROLLING FUEL CELL VEHICLE USING THE SAME

(75) Inventors: Jae Won Jung, Gyeonggi-do (KR); Nam Woo Lee, Gyeonggi-do (KR); Jae Jun Ko, Gyeonggi-do (KR); Sang Uk Kwon, Gyeonggi-do (KR); Sun Heum Baek, Gyeonggi-do (KR); Sun Soon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 381 days.

(21) Appl. No.: 12/795,022

(22) Filed: Jun. 7, 2010

(65) Prior Publication Data
US 2011/0115491 A1 May 19, 2011

(30) Foreign Application Priority Data
Nov. 16, 2009 (KR) .................. 10-2009-0110543

(51) Int. Cl.
*G01N 27/416* (2006.01)
(52) U.S. Cl.
USPC .............................. 324/431; 324/434
(58) Field of Classification Search
None
See application file for complete search history.

(56) References Cited

U.S. PATENT DOCUMENTS

| | | | |
|---|---|---|---|
| 6,358,638 B1 * | 3/2002 | Rock et al. | 429/429 |
| 6,887,598 B2 | 5/2005 | Thompson et al. | |
| 7,579,097 B2 | 8/2009 | Thompson | |
| 2008/0081224 A1 | 4/2008 | Burch et al. | |
| 2008/0311449 A1 * | 12/2008 | Kaito | 429/22 |
| 2009/0258257 A1 * | 10/2009 | Kaito | 429/13 |

FOREIGN PATENT DOCUMENTS

| | | | |
|---|---|---|---|
| JP | 2004-165058 A | 6/2004 |
| JP | 2005-032587 A | 2/2005 |
| JP | 2007-026678 A | 2/2007 |
| JP | 2007-042477 A | 2/2007 |
| JP | 2007-184202 A | 7/2007 |
| JP | 2009-016282 A | 1/2009 |
| JP | 2009-176483 A | 8/2009 |
| JP | 2009-205909 A | 9/2009 |

* cited by examiner

*Primary Examiner* — Minh N Tang
(74) *Attorney, Agent, or Firm* — Edwards Wildman Palmer LLP; Peter F. Corless (57) ABSTRACT

Disclosed is a method for detecting ice blocking of a fuel cell stack. In particular, the method includes periodically calculating a minimum cell voltage of a fuel cell stack from cell voltages measured by a cell voltage monitoring system while reactant gases are supplied to the fuel cell stack and then calculating a change in the minimum cell voltage using a currently calculated minimum cell voltage and a previous minimum cell voltage. It is then determined whether the change in the minimum cell voltage is above a predetermined reference value. When the change in the minimum cell voltage is above the reference value, it is determined that the ice blocking has occurred or is occurring in an anode of the fuel cell stack.

9 Claims, 5 Drawing Sheets

METHOD FOR DETECTING ICE BLOCKING OF FUEL CELL STACK AND CONTROLLING FUEL CELL VEHICLE USING THE SAME

CROSS-REFERENCE TO RELATED APPLICATION

This application claims under 35 U.S.C. §119(a) the benefit of Korean Patent Application No. 10-2009-0110543 filed Nov. 16, 2009, the entire contents of which are incorporated herein by reference.

BACKGROUND (a) Technical Field

The present disclosure relates, generally, to a fuel cell system. More particularly, it relates to a method for determining the occurrence of ice blocking in real time, wherein an electrode surface of a fuel cell stack is frozen out to cut off the supply of reactant gases.

(b) Background Art

A typical fuel cell system applied to a hydrogen fuel cell vehicle preferably comprises a fuel cell stack for generating electrical energy by an electrochemical reaction of reactant gases, a hydrogen supply system for suitably supplying hydrogen as a fuel to the fuel cell stack, an air supply system for suitably supplying air containing oxygen as an oxidant required for the electrochemical reaction in the fuel cell stack, a thermal management system (TMS) for suitably removing reaction heat from the fuel cell stack to the outside of the fuel cell system, controlling operation temperature of the fuel cell stack, and performing water management function, and a system controller for suitably controlling overall operation of the fuel cell system.

Preferably, the hydrogen supply system includes a hydrogen tank, high-pressure and low-pressure regulators, a hydrogen valve, a hydrogen recirculation system, etc., the air supply system includes an air blower, an air valve, a humidifier, etc., and the TMS includes a coolant pump, a radiator, etc.

Preferably, in the hydrogen supply system, high pressure hydrogen supplied from the hydrogen tank sequentially passes through the high-pressure and low-pressure regulators and then is suitably supplied to the fuel cell stack at a low pressure. Preferably, in the hydrogen recirculation system, a blower provided in a recirculation line recirculates unreacted hydrogen of an anode ("fuel electrode" or "hydrogen electrode") of the fuel cell stack to the anode, thus recycling the hydrogen.

In the air supply system, dry air supplied by the air blower passes through the humidifier to be humidified by absorbing water from exhaust gas discharged from a cathode ("air electrode" or "oxygen electrode") of the fuel cell stack and then is supplied to the cathode of the fuel cell stack.

An urgent and serious consideration of the fuel cell vehicle having the above-described fuel cell system is to ensure cold startability.

In particular, when an electrode surface of a membrane electrode assembly (MEA) is frozen out in a certain cell due to water remaining in the fuel cell stack during cold start of the fuel cell vehicle, a flow field of the corresponding cell in the fuel cell stack is shut off by the frozen ice, thus cutting off the supply of reactant gases (hydrogen and air).

For example, when a load is applied to the fuel cell system, which has been exposed to sub-zero temperatures for a long time, during initial start-up, water produced in the cathode by the electrochemical reaction is frozen by cold air of the fuel cell stack itself and air at a temperature below the freezing point supplied to the cathode, thus blocking various flow fields and a gas diffusion layer of the fuel cell stack and, at the same time, cutting off the air supply to a catalyst layer of the cathode. As a result, the voltage of the fuel cell stack is not suitably maintained constant, which makes it difficult to ensure the cold startability.

If an electrical load is suitably applied to the fuel cell stack during cold start under the conditions where the supply of reactant gases is cut off due to the frozen electrode surface, i.e., in the event of ice blocking, a reverse voltage is applied to the fuel cell stack, which damages the fuel cell stack, and as a result this can have an adverse effect on the durability.

However, in certain examples where ice blocking occurs in the cathode due to the frozen electrode surface, only the air supply is cut off, and thus it is possible to obtain considerable output power only with the reaction of hydrogen without deterioration of the fuel cell stack. Accordingly, the reverse voltage in this case can preferably be ignored. Further, since it is possible to use the output power of the fuel cell stack without suitable deterioration of the catalyst layer, it is possible to suitably perform limited operations such as the cold start process and the vehicle running.

However, in the case that the ice blocking occurs in the anode electrode, the hydrogen supply is cut off, and thus the catalyst layer of the electrode surface is suitably damaged even with a relatively small load. Accordingly, it is necessary to perform an emergency shut-down process immediately.

Accordingly, a technique for distinguishing the ice blocking in the anode (hereinafter referred to as "anode ice blocking") from the ice blocking occurring in the cathode (hereinafter referred to as "cathode ice blocking") is needed in the art.

Figure 2:
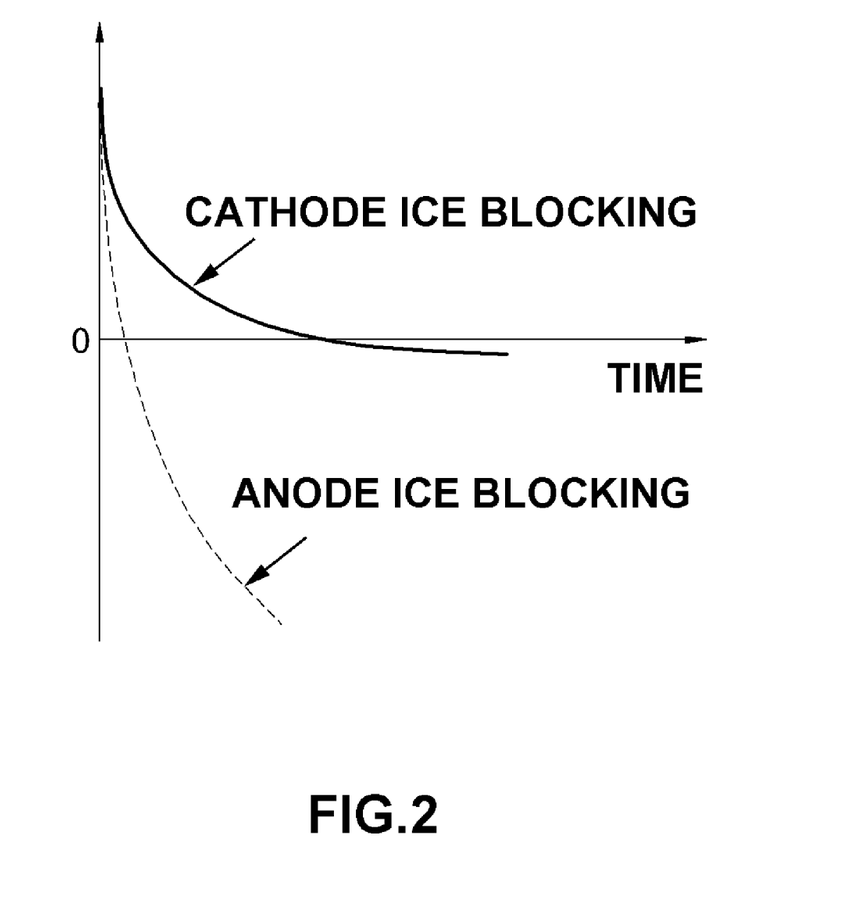
FIG. 2 is a graph showing the voltages of cells in which ice blocking occurs due to a frozen electrode surface.

FIG. 2 is a graph showing the voltages of cells in which the ice blocking occurs due to the frozen electrode surface. It is possible to distinguish the anode ice blocking from the cathode ice blocking by comparing the reverse voltages generated in each single cell.

Preferably, when examining the reverse voltage behavior due to a lack of air on the electrode surface of the cathode during the cathode ice blocking, it can be seen that although the reverse voltage is generated, a constant voltage is suitably maintained near −0 V for several seconds or minutes and the cathode electrode may not be deteriorated by this reverse voltage behavior.

However, a sudden reverse voltage (above −1 V) is generated during the anode ice blocking compared to the lack of air in the cathode, and thereby the catalyst layer of the electrode may be deteriorated.

Preferably, in order to distinguish the anode ice blocking from the cathode ice blocking, it is necessary to measure the reverse voltage of each single cell in the fuel cell stack in which a plurality of unit cells are stacked.

In particular, it is difficult to install a complicated and expensive voltage detector in each cell to measure the reverse voltage of each single cell. Even though it is installed in each single cell, the configuration of the fuel cell system applied to a vehicle is complicated, and the cost of the vehicle is considerably increased.

Accordingly, it is difficult to distinguish the anode ice blocking from the cathode ice blocking by measuring the reverse voltage of each signal cell in the fuel cell stack and control the vehicle using the same.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for suitably determining the occurrence of ice blocking in an electrode surface in real time by analyzing minimum cell voltages of a fuel cell stack and, at the same time, suitably distinguishing the occurrence of ice blocking in an anode from the occurrence of ice blocking in a cathode.

In a preferred embodiment, the present invention provides a method for detecting ice blocking of a fuel cell stack, the method preferably including: (a) periodically calculating a minimum cell voltage of a fuel cell stack from cell voltages measured by a cell voltage monitoring system while reactant gases are suitably supplied to the fuel cell stack; (b) suitably calculating a change in the minimum cell voltage using a currently calculated minimum cell voltage and a previous minimum cell voltage; (c) suitably determining whether the change in the minimum cell voltage is above a predetermined reference value; and (d) suitably determining that the ice blocking occurs in an anode of the fuel cell stack when the change in the minimum cell voltage is above the reference value.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| 10: fuel cell stack | 11: air supply system |
| 12: hydrogen supply system | 13: cell voltage monitoring system |
| 20: controller | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the present invention features a method for detecting ice blocking of a fuel cell stack, the method comprising (a) calculating a minimum cell voltage of a fuel cell stack, (b) calculating a change in the minimum cell voltage using a currently calculated minimum cell voltage and a previous minimum cell voltage, (c) determining whether the change in the minimum cell voltage is above a predetermined reference value, and (d) determining that the ice blocking occurs in an anode of the fuel cell stack when the change in the minimum cell voltage is above the reference value.

In one embodiment, the minimum cell voltage is calculated from cell voltages measured by a cell voltage monitoring system while reactant gases are supplied to the fuel cell stack.

In another aspect, the present invention features a method for controlling a fuel cell vehicle, the method comprising (a) periodically calculating a minimum cell voltage of a fuel cell stack from cell voltages measured by a cell voltage monitoring system while reactant gases are supplied to the fuel cell stack, (b) calculating a change in the minimum cell voltage using a currently calculated minimum cell voltage and a previous minimum cell voltage, (c) determining whether the change in the minimum cell voltage is above a predetermined reference value, (d) determining that the ice blocking occurs in an anode of the fuel cell stack when the change in the minimum cell voltage is above the reference value; and (e) stopping the operation of the fuel cell stack by shutting down a fuel cell system when it is determined that the ice blocking occurs in the anode.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention preferably provides a method for determining the occurrence of ice blocking in real time, wherein an electrode surface of a fuel cell stack is frozen to cut off the supply of reactant gases (hydrogen and air), wherein the method clearly distinguishes the occurrence of ice blocking in an anode of the fuel cell stack (causing cutting-off of hydrogen supply) from the occurrence of ice blocking in a cathode of the fuel cell stack (causing cutting-off of air supply).

Accordingly, the present invention described herein distinguishes the anode ice blocking from the cathode ice blocking preferably only by analyzing cell voltages measured by a cell voltage monitoring system suitably mounted in an existing fuel cell vehicle, thereby overcoming the limitations of a theoretical method, which cannot be applied to an actual vehicle, for suitably distinguishing the anode ice blocking from the cathode ice blocking by suitably measuring the reverse voltage of each single cell and suitably analyzing the voltage behavior.

Preferably, when the existing cell voltage monitoring system is used, it is possible to suitably detect the ice blocking occurring on the electrode surface of the fuel cell stack in real time without the use of a complicated and expensive voltage detector and, in particular, it is possible to suitably distinguish the anode ice blocking, which causes deterioration of the fuel cell stack, from the cathode ice blocking.

Figure 1:
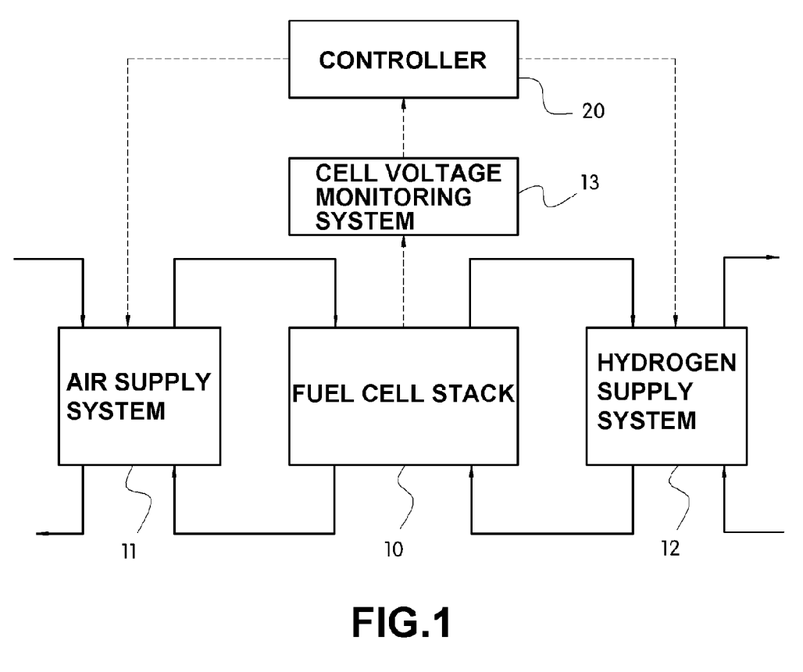
FIG. 1 is a block diagram showing an exemplary fuel cell system including a cell voltage monitoring system.

According to preferred embodiments of the present invention and as shown in FIG. 1, for example, FIG. 1 is a block diagram showing a fuel cell system including a cell voltage monitoring system. In a typical fuel cell vehicle, the entire cells of a fuel cell stack 10 are suitably divided into a plurality of groups, and the series voltage output from the cells of each group is measured by a cell voltage monitoring system 13.

Preferably, here, the cell voltage monitoring system 13 suitably calculates the average voltage of the cells in each group in real time by dividing the series voltage of the corresponding group by a predetermined number of cells, and then a controller 20 suitably calculates a minimum cell voltage of the fuel cell stack by comparing the average voltages of the cells measured by the cell voltage monitoring system 13 to obtain a minimum value of the average voltages.

Accordingly, in further preferred embodiments, the thus obtained minimum cell voltage can be used as an important control variable of the fuel cell system for determining the occurrence of the existing ice blocking. Accordingly, this is a new concept that is different from the reverse voltage of each single cell.

Preferably, since the cell voltage monitoring system 13 is suitably configured only to obtain a minimum value by measuring the average voltages of the cells in the groups obtained by dividing the plurality of cells in the fuel cell stack, it cannot measure the reverse voltage. Accordingly, it is impossible to detect the ice blocking and suitably distinguish whether it occurs in the cathode or anode based on the measurement value of the cell voltage monitoring system 13.

Figure 3:
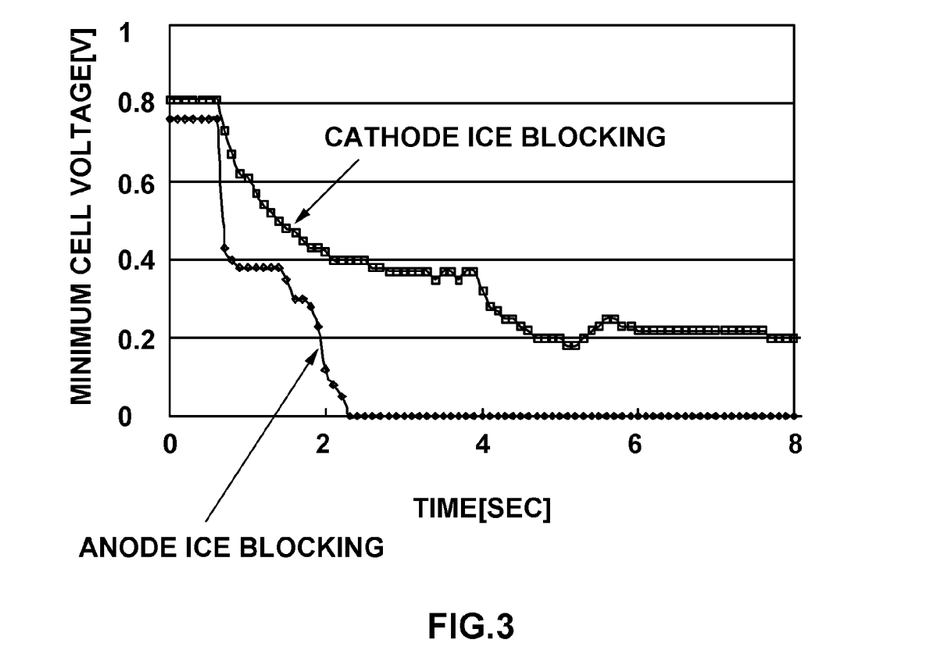
FIG. 3 is a graph showing the analysis results of minimum cell voltage data obtained during cold start test, in which minimum cell voltages during cathode ice blocking and those during anode ice blocking are compared.

According to preferred embodiments of the present invention and as shown in FIG. 3, for example, FIG. 3 shows the analysis results of the minimum cell voltage data obtained during cold start test, in which the minimum cell voltages during the cathode ice blocking and those during anode ice blocking, which are suitably obtained from the measurement values of the cell voltage monitoring system, are compared.

According to preferred exemplary embodiments and, for example as it can be seen from FIG. 3, although it is possible to know the drop of the minimum cell voltage during cold start by suitably analyzing the data obtained from the cell voltages measured by the cell voltage monitoring system, it is impossible to determine the occurrence of the reverse voltage having a negative value. Accordingly, although it is possible to observe that the minimum cell voltage drops rapidly after the output of the fuel cell stack and is maintained 0 V during the anode ice blocking, it is impossible to suitably determine the occurrence of the reverse voltage in each single cell.

Preferably, according to further preferred embodiments, after analyzing the minimum cell voltage data, the inventor of the present invention confirmed that although the minimum cell voltage drops continuously during the cathode ice blocking, the minimum cell voltage drops rapidly during the anode ice blocking immediately after the output of the fuel cell stack.

Accordingly, in preferred embodiments of the present invention, it is possible to find a period during which the minimum cell voltage drops rapidly at a certain point of time by the output of the fuel cell stack during the anode ice blocking by comparing with the cathode ice blocking, and accordingly, in further preferred embodiments, if this period is suitably analyzed, it is possible to distinguish the anode ice blocking from the cathode ice blocking.

Based on this finding, in further preferred embodiments of the present invention as described herein, the inventor of the present invention has developed a method for suitably preventing the deterioration of the fuel cell stack and suitably improving the durability of the fuel cell stack by distinguishing the anode ice blocking, which causes deterioration of the fuel cell stack even with a relatively small output, from the cathode ice blocking with the analysis of the behavior of the minimum cell voltage.

Figure 4:
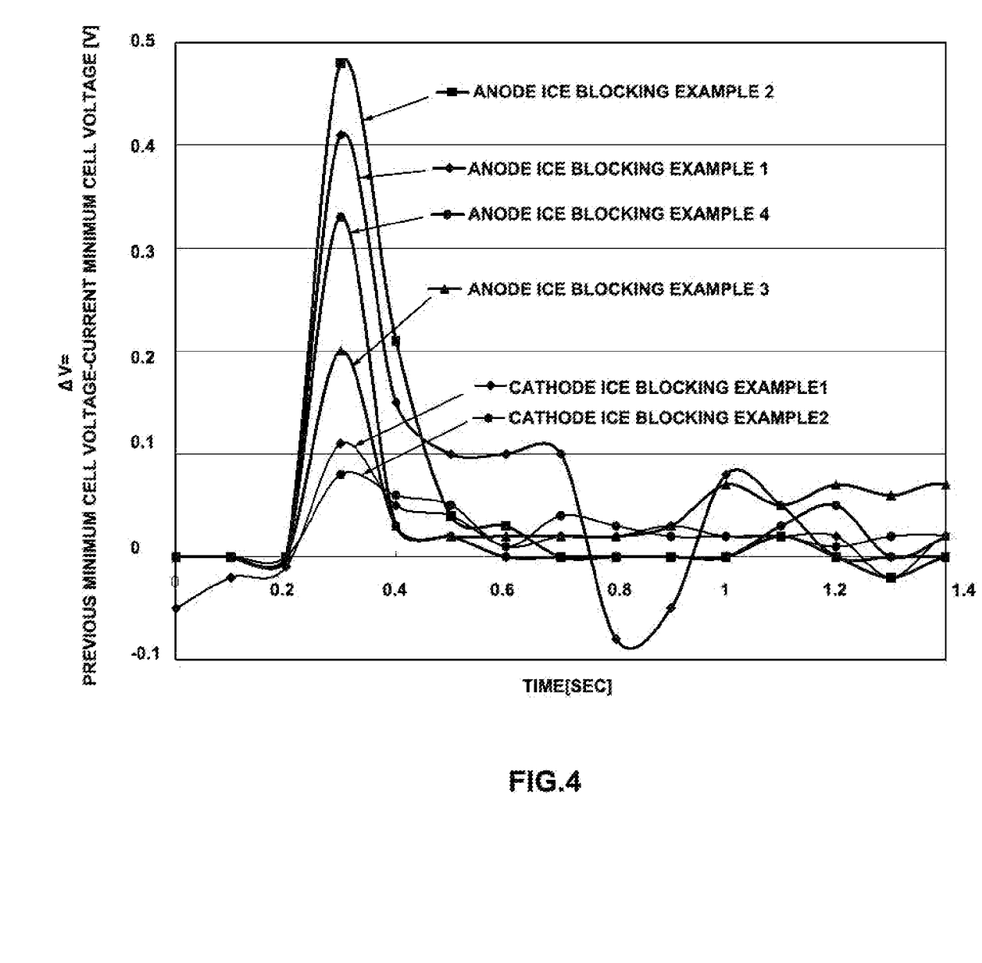
FIG. 4 is a graph showing the analysis results of minimum cell voltage data obtained in various examples where cathode ice blocking and anode ice blocking occur during cold start test, in which changes in the minimum cell voltage according to time are shown.

According to preferred embodiments of the present invention and as shown in FIG. 1, for example, FIG. 4 shows the analysis results of the minimum cell voltage data obtained in various examples where the cathode ice blocking and the anode ice blocking occur during cold start test, in which changes in the minimum cell voltage according to time are shown.

Preferably, in each example, the change in the minimum cell voltage is suitably obtained by setting a sampling period having a predetermined time interval (e.g., 2 seconds) and calculating a difference between the previous minimum cell voltage and the current minimum cell voltage ($\Delta V$=the previous minimum cell voltage–the current minimum cell voltage) at each sampling time.

For example, as shown in FIG. 4, it is possible to suitably obtain the change in the minimum cell voltage at each sampling time in real time, and especially it can be seen that in the event of the anode ice blocking, the change in the minimum cell voltage is considerably increased at a certain point of time compared to the cathode ice blocking.

Accordingly, in preferred exemplary embodiments of the present invention, it is possible to suitably determine the anode ice blocking by the analysis of the change in the minimum cell voltage and control the fuel cell vehicle using the determined anode ice blocking. Preferably, when the change in the minimum cell voltage goes beyond a certain value during the start-up (cold start) process, it can be determined that the anode ice blocking occurs.

Accordingly, in further preferred embodiments of the present invention, the thus obtained minimum cell voltage can be used as an important control variable of the fuel cell system for determining the occurrence of the existing ice blocking and is a new concept different from the reverse voltage of each single cell.

As described herein, when the cell voltage monitoring system 13 calculates the average voltage of the cells in each group, the controller 20 suitably calculates the minimum cell voltage of the fuel cell stack by comparing the average voltages of the cells in the groups received from the cell voltage monitoring system 13. In particularly preferred embodiments, the cell voltage monitoring system 13 may calculate the average voltage of the cells in each group and then calculate the minimum cell voltage of the fuel cell stack by comparing the average voltages of the cells in the groups, and then the controller 20 may receive the minimum cell voltage calculated by the cell voltage monitoring system 13 and utilize the received minimum cell voltage in the control process.

Figure 5:
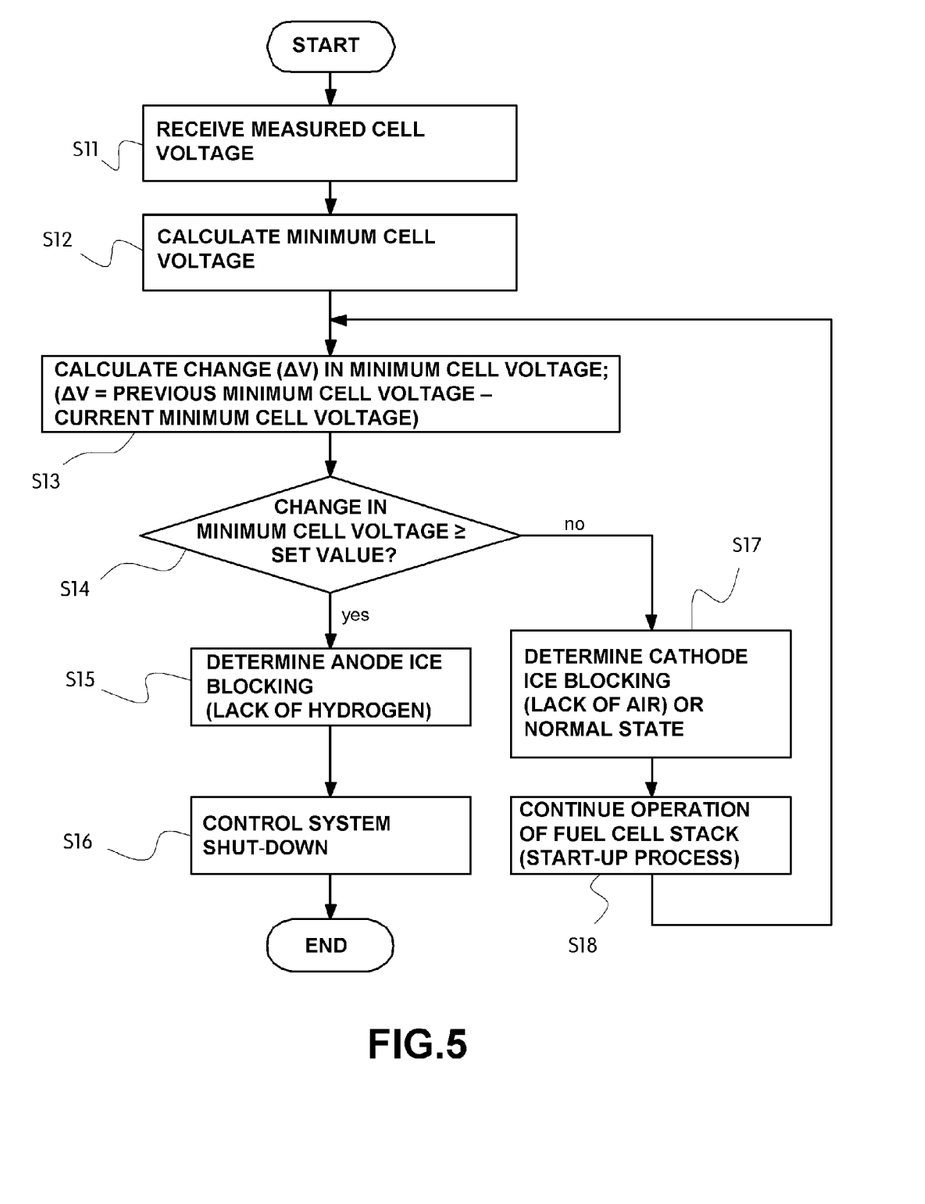
FIG. 5 is a flowchart illustrating a method for determining the occurrence of ice blocking and controlling a fuel cell vehicle.

According to preferred embodiments of the present invention and as shown in FIG. 1, for example, FIG. 5 is a flowchart illustrating the method for distinguishing the anode ice blocking from the cathode ice blocking using the above-described method, described hereinbelow.

According to preferred exemplary embodiments, a process for determining the occurrence of ice blocking and controlling a fuel cell vehicle, as described herein, may preferably be performed during the start-up (cold start) process of the fuel cell system.

In a preferred exemplary embodiment, first, the controller 20 suitably detects a start signal of the fuel cell system from a key input and receives the values of cell voltages suitably measured by the fuel cell stack 10, i.e., the average voltages of the cells in the groups, from the cell voltage monitoring system 13 in a state where the reactant gases are supplied to the fuel cell stack 10 (S11).

Preferably, then, the controller 20 calculates a minimum cell voltage of the fuel cell stack by comparing the average voltage of the cells in the groups received from the cell voltage monitoring system 13 to obtain a minimum value of the average voltages (S12).

According to another further preferred embodiment, the cell voltage monitoring system 13 measures the average voltages of the cells in the groups at a predetermined time interval in real time and transmits the measured average voltages to the controller 20, and the controller 20 suitably calculates the minimum cell voltage at each point of time in real time.

In further preferred embodiments, while the minimum cell voltages are suitably obtained in the above manner, the controller 20 suitably obtains a change in the minimum cell voltage at each point of time (ΔV=the previous minimum cell voltage–the current minimum cell voltage) (S13) and compares the change in the minimum cell voltage with a predetermined reference value in real time (S14).

In other further embodiments, the controller 20 may suitably reset the current minimum cell voltage to the previous minimum cell voltage at each point of time so as to calculate the change in the minimum cell voltage at a predetermined time interval in real time, and thereby it is possible to obtain the change in the minimum cell voltage using the current minimum cell voltage obtained at the next point of time and the previous minimum cell voltage which has been reset.

Accordingly, when the change in the minimum cell voltage is above a predetermined value, the controller 20 determines the occurrence of the anode ice blocking in which the hydrogen supply is cut off (S15). Next, when the output of the fuel cell stack continues during a lack of hydrogen, the catalyst layer of the electrode surface may be damaged and, therefore, the controller performs an emergency shut-down process immediately to stop the operation of the fuel cell stack (S16).

In further exemplary embodiments, the shut-down process performed during the anode ice blocking is carried out in accordance with a typical shut-down process.

Further, if the change in the minimum cell voltage is below the reference value, the controller 20 suitably determines the occurrence of the cathode ice blocking, in which the air supply is cut off, or determines the normal state (S17). Although there is a lack of air when the cathode ice blocking occurs, the deterioration of the fuel cell stack is not caused, and thus the normal start-up process and the operation of the fuel cell stack can continue (S18).

As described herein, according to the present invention, it is possible to suitably determine the occurrence of the ice blocking on the electrode surface in real time from the change in the minimum cell voltage measured from the fuel cell stack and distinguish the anode ice blocking from the cathode ice blocking.

Further, according to the present invention as described herein, it is possible to suitably determine the occurrence of ice blocking without the use of a complicated and expensive voltage detector and to accurately distinguish the anode ice blocking, which causes the deterioration of the fuel cell stack during operation, from the cathode ice blocking. Accordingly, in preferred embodiments of the present invention, it is possible to shut down the fuel cell system by accurately determining the point of time at which the deterioration of the fuel cell stack occurs, and thereby it is possible to prevent the fuel cell system from being shut down unnecessarily.

Further, according to the present invention, since it is possible to suitably distinguish the anode ice blocking from the cathode ice blocking and suitably control the operation of the fuel cell system (shut down the fuel cell system in the event of the occurrence of the anode ice blocking), it is possible to suitably prevent the deterioration of the fuel cell stack during cold start and suitably improve the durability of the fuel cell stack.

Further, according to the present invention as described herein, it is possible to reflect the occurrence of the anode ice blocking to various control logics of the fuel cell vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for detecting ice blocking of a fuel cell stack, the method comprising:
   (a) periodically calculating, by a controller, a minimum cell voltage of a fuel cell stack from cell voltages measured by a cell voltage monitoring system while reactant gases are supplied to the fuel cell stack, wherein the minimum cell voltage of the fuel cell stack is calculated by comparing a plurality of average voltages of the cells measured by the cell voltage monitoring system to obtain a minimum value of the plurality of average voltages;
   (b) calculating, by the controller, a change in the minimum cell voltage using a currently calculated minimum cell voltage and a previous minimum cell voltage;
   (c) determining, by the controller, whether the change in the minimum cell voltage is above a predetermined reference value; and
   (d) determining, by the controller, that the ice blocking occurs in an anode of the fuel cell stack when the change in the minimum cell voltage is above the reference value.

2. The method of claim 1, wherein steps (a) to (d) are performed in a start-up process of a fuel cell system after a start signal is detected from a key input.

3. The method of claim 1, wherein in step (a), the minimum cell voltage is calculated from a minimum value obtained by comparing average voltages of cells in groups each including a plurality of cells in the entire cells of the fuel cell stack.

4. A method for controlling a fuel cell vehicle, the method comprising:

(a) periodically calculating, by a controller, a minimum cell voltage of a fuel cell stack from cell voltages measured by a cell voltage monitoring system while reactant gases are supplied to the fuel cell stack, wherein the minimum cell voltage of the fuel cell stack is calculated by comparing a plurality of average voltages of the cells measured by a cell voltage monitoring system to obtain a minimum value of the plurality of average voltages;

(b) calculating, by a controller, a change in the minimum cell voltage using a currently calculated minimum cell voltage and a previous minimum cell voltage;

(c) determining, by a controller, whether the change in the minimum cell voltage is above a predetermined reference value;

(d) determining, by a controller, that the ice blocking occurs in an anode of the fuel cell stack when the change in the minimum cell voltage is above the reference value; and (e) stopping, by a controller, the operation of the fuel cell stack by shutting down a fuel cell system when it is determined that the ice blocking occurs in the anode.

5. The method of claim 4, wherein steps (a) to (e) are performed in a start-up process of a fuel cell system after a start signal is detected from a key input.

6. The method of claim 4, wherein the operation of the fuel cell stack continues when the change in the minimum cell voltage is below the reference value.

7. The method of claim 4, wherein in step (a), the minimum cell voltage is calculated from a minimum value obtained by comparing average voltages of cells in groups each including a plurality of cells in the entire cells of the fuel cell stack.

8. A method for detecting ice blocking of a fuel cell stack, the method comprising:

(a) calculating, by a controller, a minimum cell voltage of a fuel cell stack, wherein the minimum cell voltage of the fuel cell stack is calculated by comparing a plurality of average voltages of the cells measured by a cell voltage monitoring system to obtain a minimum value of the plurality of average voltages;

(b) calculating, by the controller, a change in the minimum cell voltage using a currently calculated minimum cell voltage and a previous minimum cell voltage;

(c) determining, by the controller, whether the change in the minimum cell voltage is above a predetermined reference value; and (d) determining, by the controller, that the ice blocking occurs in an anode of the fuel cell stack when the change in the minimum cell voltage is above the reference value.

9. The method of claim 8, wherein the minimum cell voltage is calculated from cell voltages measured by a cell voltage monitoring system while reactant gases are supplied to the fuel cell stack.

* * * * *